(12) United States Patent
Del Monte et al.

(10) Patent No.: US 9,005,402 B2
(45) Date of Patent: Apr. 14, 2015

(54) RECIPROCATING REACTOR AND METHODS FOR THERMAL DECOMPOSITION OF CARBONACEOUS FEEDSTOCK

(75) Inventors: Thomas R. Del Monte, San Diego, CA (US); Eren K. Yar, San Diego, CA (US)

(73) Assignee: Interra Energy, Inc., San Diego, CA (US)

( * ) Notice: Subject to any disclaimer, the term of this patent is extended or adjusted under 35 U.S.C. 154(b) by 562 days.

(21) Appl. No.: 13/422,011

(22) Filed: Mar. 16, 2012

(65) Prior Publication Data

US 2012/0285814 A1  Nov. 15, 2012

Related U.S. Application Data

(60) Provisional application No. 61/486,231, filed on May 14, 2011.

(51) Int. Cl.
| | |
|---|---|
| *C10B 1/06* | (2006.01) |
| *C10B 7/10* | (2006.01) |
| *C10B 49/02* | (2006.01) |
| *C10B 53/02* | (2006.01) |
| *C10B 57/00* | (2006.01) |
| *C10L 9/08* | (2006.01) |
| *B01J 8/08* | (2006.01) |
| *B01J 8/10* | (2006.01) |

(52) U.S. Cl.
CPC . *C10B 7/10* (2013.01); *C10B 49/02* (2013.01); *C10B 53/02* (2013.01); *C10B 57/00* (2013.01); *C10L 9/083* (2013.01); *Y02E 50/14* (2013.01); *Y02E 50/15* (2013.01); *B01J 8/087* (2013.01); *B01J 8/10* (2013.01); *B01J 2208/0053* (2013.01)

(58) Field of Classification Search
CPC .......... C10B 1/06; C10B 7/10; C10B 49/902; C10B 53/02; C10L 9/083; Y02E 50/14; Y02E 50/15
USPC .......... 201/32, 36; 202/84, 118, 119, 135, 136
See application file for complete search history.

(56) References Cited

U.S. PATENT DOCUMENTS

| | | | | |
|---|---|---|---|---|
| 3,481,720 A | * | 12/1969 | Bennett | 48/89 |
| 4,180,455 A | * | 12/1979 | Taciuk | 208/126 |
| 4,280,879 A | * | 7/1981 | Taciuk | 202/100 |
| 4,285,773 A | * | 8/1981 | Taciuk | 202/100 |
| 4,306,961 A | * | 12/1981 | Taciuk | 208/390 |
| 4,308,103 A | * | 12/1981 | Rotter | 202/117 |
| 4,495,056 A | * | 1/1985 | Venardos et al. | 208/425 |
| 5,017,269 A | * | 5/1991 | Loomans et al. | 201/25 |
| 5,078,836 A | * | 1/1992 | Hogan | 201/7 |
| 5,088,856 A | * | 2/1992 | Yocum | 405/128.85 |
| 5,217,578 A | * | 6/1993 | Taciuk et al. | 202/100 |
| 6,105,275 A | * | 8/2000 | Aulbaugh et al. | 34/424 |

(Continued)

*Primary Examiner* — Nina Bhat
*Assistant Examiner* — Jonathan Miller

(57) ABSTRACT

The present technology describes apparatus, systems, and methods for the thermal decomposition of carbonaceous feedstocks through continuous pyrolysis. A reciprocating reactor is described that includes an inner reactor pipe and an outer reactor pipe. The outer reactor pipe has a first portion that surrounds the inner reactor pipe forming an annulus space, and a second portion that extends beyond the inner reactor pipe and forms a turnaround zone. The inner reactor pipe defines an inner reactor zone that produces partially reacted carbonaceous feedstock, and the annulus space defines an outer reactor zone that produces product gases and solids.

14 Claims, 5 Drawing Sheets

(56) References Cited

U.S. PATENT DOCUMENTS

| | | | |
|---|---|---|---|
| 7,144,558 B2* | 12/2006 | Smith et al. | 422/224 |
| 7,893,307 B2* | 2/2011 | Smith | 585/241 |
| 8,304,590 B2* | 11/2012 | Hopkins et al. | 585/240 |
| 8,388,813 B1* | 3/2013 | Livingston et al. | 202/118 |
| 8,795,475 B2* | 8/2014 | Hutchins et al. | 201/29 |
| 8,835,704 B2* | 9/2014 | Hornung et al. | 585/240 |
| 2008/0286557 A1* | 11/2008 | Tucker | 428/318.4 |

\* cited by examiner

RECIPROCATING REACTOR AND METHODS FOR THERMAL DECOMPOSITION OF CARBONACEOUS FEEDSTOCK

RELATED APPLICATIONS

This application claims priority to U.S. Provisional Application Ser. No. 61/486,231, filed on May 14, 2011, currently pending, the disclosure of which is hereby incorporated by reference in its entirety.

FIELD OF THE INVENTION

The present technology relates to methods, systems, and apparatus for the thermal decomposition of carbonaceous feedstocks.

DESCRIPTION OF RELATED ART

Pyrolysis is a process for the thermal conversion, or decomposition, of carbonaceous feedstocks, sometimes referred to as biomass, to produce biochar, water, and gases.

The term "carbonaceous feedstock" includes all sorts of organic material, such as woody and herbaceous plant material and agricultural residues, including for example wood logs, slabs, chips, and bark, corncobs, corn stover, wheat straw, nutshells, and sugar cane bagasse. Carbonaceous feedstocks may also include the organic fraction of municipal solid wastes, plastics, tire, sewage sludge, manure, or other excrement, and the residues of animal husbandry, such as bones and carcasses.

The term "biochar" refers to the charred material that results from pyrolysis of a carbonaceous feedstock. There are many uses for biochar, including using it as a soil amendment to improve plant yield, improve water retention, reduce soil emissions of greenhouse gases, reduce nutrient leaching, and reduce soil acidity. Some consider biochar production and use in soil to be a useful approach to carbon sequestration.

In one exemplary pyrolysis process, wood can be used as the carbonaceous feedstock. Under laboratory conditions and atmospheric pressure the following stages in the conversion process have been recognized:

1. 20° C. to 110° C.—The wood absorbs heat as it is dried, giving off moisture as water vapor (steam). The temperature remains at or slightly above 100° C. until the wood is substantially dry.
2. 110° C. to 270° C.—The wood absorbs heat. Final traces of water are given off as water vapor (steam) and the wood starts to decompose, giving off some carbon monoxide, carbon dioxide, acetic acid and methanol.
3. 270° C. to 290° C.—Exothermic decomposition of the wood starts. Heat is evolved and breakdown continues spontaneously providing the wood is not cooled below this decomposition temperature. Mixed gases and vapors continue to be given off, together with some tar.
4. 290° C. to 400° C.—Breakdown of the wood structure continues, the vapors given off include combustible gases, such as carbon monoxide, hydrogen and methane, together with carbon dioxide gas, and also include condensable vapors, such as water, acetic acid, methanol, acetone, etc. Additionally, the vapors given off also include tars, which begin to predominate as the temperature rises.
5. 400° C. to 500° C.—At about 400° C. transformation of the wood to biochar is practically complete. The biochar at this temperature still contains appreciable amounts of tar, perhaps about 30% by weight, trapped in the structure. The biochar needs further heating to drive off more of the tar and thus raise the fixed carbon content of the biochar to about 75%, which is normal for good quality commercial charcoal. In order to drive off additional tar, the biochar is subjected to further heat inputs to raise its temperature to about 500° C., thus completing the carbonization stage.

It is known within the art that elevated reactor pressure has several effects on the pyrolysis reaction of carbonaceous materials. Notably, pyrolysis begins at lower temperatures, releases substantially more energy during the reaction, increases fixed-carbon yields, and changes the product gas composition. In additional to having substantially less tar, the product gas composition favors water and methane production over carbon dioxide, hydrogen, and carbon monoxide.

Pyrolysing technologies can be broadly categorized into either batch or continuous-process systems. Most advanced carbonization systems employ continuous processing for a range of reasons, including operational efficiency, thermal efficiency, conversion efficiency, capital efficiency, and greater process and emissions control, among other reasons.

To generate sufficient heat to start and maintain continuous pyrolysis, the currently known processes typically rely to some degree on combustion, whether internal, external, or both. Internal combustion generally involves allowing limited amounts of air into the pyrolysis enclosure to provide the necessary oxygen for partial combustion of the pyrolysis products. This is problematic for two main reasons. First, any level of combustion decreases pyrolysis product yields. Second, the inert gases in the injected air and the combustion products dilute the pyrolysis gas products, making them less useful and often unburnable, which results in increased air pollution.

To overcome the problems associated with the use of internal combustion, many pyrolysis systems are designed to provide the necessary heat using an external heat source, usually combustion, and heat the feedstock via heat transfer through the outer wall of the reactor vessel. Pyrolysis methods using external heat sources also have significant shortcomings. Notably, the heat source required to heat the vessel adds to the operational cost of such systems. Also, using combustion as the heat source creates an air emissions source that can be detrimental to the environment.

Furthermore, the gases generated by traditional pyrolysis systems are generally composed of a mixture of combustible (such as carbon monoxide, hydrogen, small amounts of methane, and tar vapors) and non-combustible (such as water, nitrogen, and carbon dioxide) components. The energy density of typical pyrolysis gas is relatively low compared to other fuel gases. Upgrading the gas can be expensive and is highly dependent on the chosen method. The least expensive method is usually dehumidification to extract out the majority of the water vapor that formed during reaction. Dehumidification is often accomplished by simply cooling the gas in a separate dehumidification system. Cooling gas at elevated pressures allows for more vapor removal at a fixed temperature due to pressure's effect of rising of the dew point temperature.

Another common method of gas upgrading is aimed at selectively extracting the carbon dioxide portion of the gas. This is accomplished in several different ways in the art. One common method uses a water scrubbing tower where the product gas is forced to come in contact with water so that the water will absorb carbon dioxide out of the product gas. However, the effectiveness of this method is dependent on the original methane and carbon monoxide compositions in the raw product gas. For example, some pyrolysis reactors produce mainly hydrogen and carbon monoxide as the flammable portion of the gas with limited portions of methane. For these reactors, the ultimate achievable energy density of the gas will be limited because of the relatively low energy densities of hydrogen and carbon monoxide compared to methane. Also those reactors using internal combustion facilitated by air injection have high levels of nitrogen diluting the gas which is both expensive and difficult to remove.

Under economic realities, it is usually infeasible to provide needed heat by electric heating or pure oxygen injection. Thus, systems based on internal combustion tend to ultimately suffer from low quality product gas and loss of potential biochar yield. On the other hand, systems based upon external combustion typically suffer from multiple emissions sources and the expense of burning excess fuel.

SUMMARY OF THE INVENTION

The present technology relates to systems, methods, and apparatus for the continuous thermal conversion of carbonaceous feedstock into products, and more particularly to a reciprocating reactor that can be used as a component in systems and methods of continuous pyrolysis.

In one aspect, the present technology provides a continuous pyrolysis system comprising a feeder assembly through which a carbonaceous feedstock can be introduced into the continuous pyrolysis system, a reciprocating reactor assembly configured to receive the carbonaceous feedstock and react the carbonaceous feedstock to produce product gases and product solids, a gas off-take assembly, a solids off-take assembly, and a junction. The reciprocating reactor assembly can include an inner reactor pipe and an outer reactor pipe. The outer reactor pipe can have a first portion that surrounds the inner reactor pipe forming an annulus space and a second portion that extends beyond the inner reactor pipe and forms a turnaround zone, wherein the inner reactor pipe defines an inner reactor zone that produces partially reacted carbonaceous feedstock and the annulus space defines an outer reactor zone that produces the product gases and product solids. The gas off-take assembly can be fluidly connected to the outer reactor zone of the reciprocating reactor assembly and configured to remove product gases from the continuous pyrolysis system. The solids off-take assembly can be fluidly connected to the outer reactor zone of the reciprocating reactor assembly and configured to remove product solids from the continuous pyrolysis system. The junction can fluidly join the feeder assembly to the reciprocating reactor assembly, and the outer reactor zone to the gas off-take assembly and the solids off-take assembly.

In another aspect, the present technology provides a method of continuous pyrolysis. The method can include steps of: providing carbonaceous feedstock to a feeder assembly, passing the carbonaceous feedstock from the feeder assembly to a junction, passing the carbonaceous feedstock from the junction to the reciprocating reactor assembly, reacting the carbonaceous feedstock in the reciprocating reactor assembly to form product gases and product solids, passing the product gases and the product solids from the reciprocating reactor assembly to the junction, passing the product gases from the junction to a gas off-take assembly, passing the product solids from the junction to a solids off-take assembly, removing product gases from the continuous pyrolysis system through the gas off-take assembly, and removing product solids from the continuous pyrolysis system through the solids off-take assembly.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
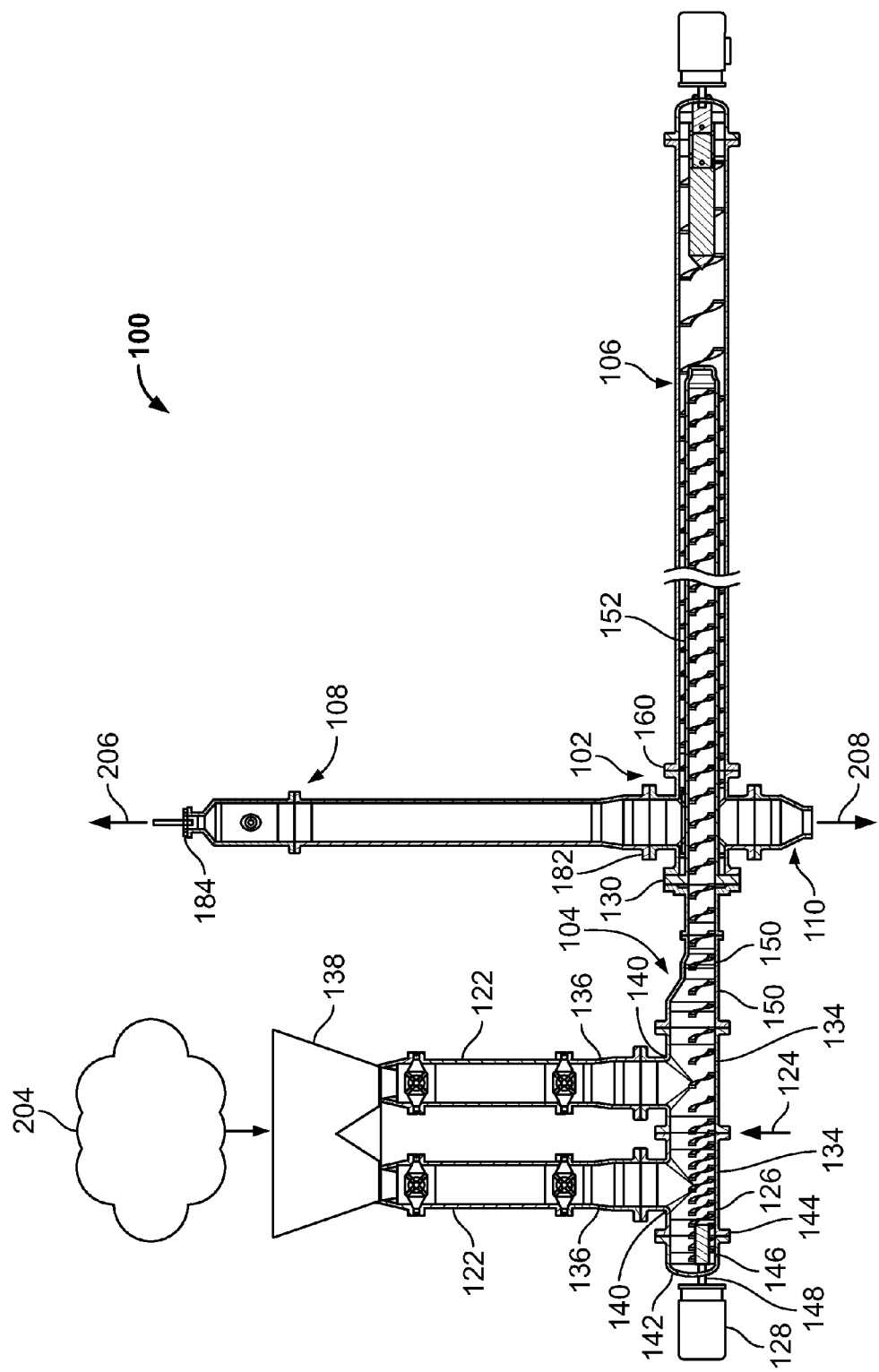
FIG. 1 illustrates one example of a continuous pyrolysis system of the present technology.

The continuous pyrolysis methods, systems and apparatus of the present technology provide efficient uses of heat transfer, and capture and make use of the potential energy stored in water vapor released during the phase change from vapor to liquid water, in order to affect pyrolysis of carbonaceous feedstocks. The methods, systems and apparatus of the present technology include pressurizable systems using a reciprocating reactor that provides for heat recycling from outgoing biochar and gases to incoming feedstock. Therefore the material in the reactor assembly flows through in a reciprocating manner. The pressurizable systems can also include a gas and solids extraction system that scrubs the gas with water and then uses the water to create a pressure seal in which solids can be extracted.

Continuous pyrolysis systems of the present technology operate at or above the minimum temperature sufficient to facilitate a desired level of thermal breakdown of the chosen feedstock at the given throughput and geometry of the particular continuous pyrolysis system. A continuous pyrolysis system's operation temperature, feedstock residence time, and pressure can be varied to produce products having different characteristics as desired. Continuous pyrolysis systems of the present technology are thermally efficient because they transfer a sufficient amount of heat from the outgoing products back into the incoming feedstock to maintain a steady-state reaction within the reciprocating reactor of the continuous pyrolysis system.

FIGS. 1 through 5 illustrate one example of a continuous pyrolysis system 100 of the present technology. The continuous pyrolysis system 100 includes a junction 102, a feeder assembly 104, a reciprocating reactor assembly 106, a gas off-take assembly 108, and a solids off-take assembly 110. Each of these components, and the connections attaching them together, can be pressurizable up to an amount deemed safe to operate at the desired operating conditions. The continuous pyrolysis system 100 can also include a control system, which can be used to control operation of the system.

Figure 2:
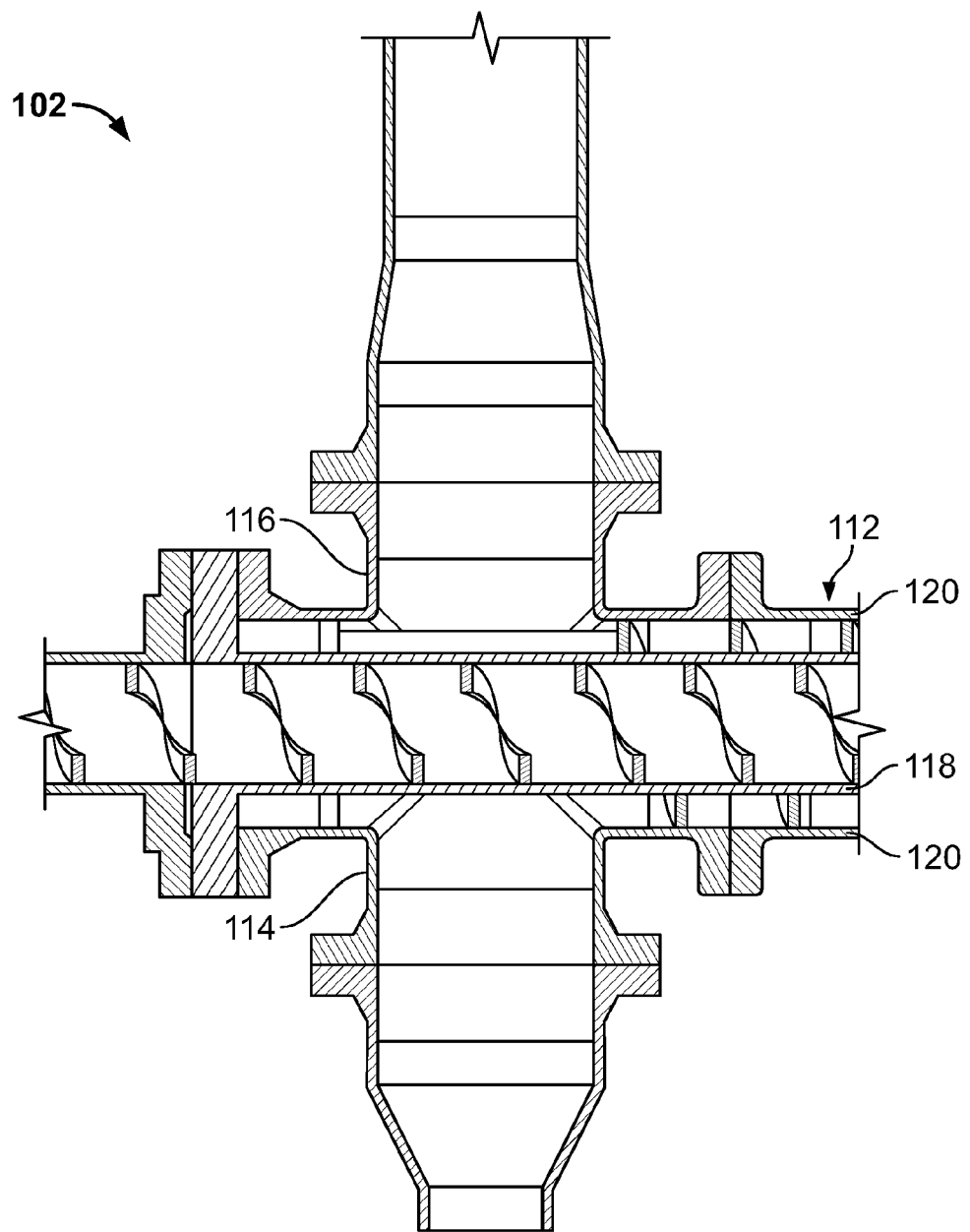
FIG. 2 illustrates one example of a junction for use in the continuous pyrolysis system of FIG. 1.

As shown in FIGS. 1 and 2, the junction 102 joins together the feeder assembly 104, reciprocating reactor assembly 106, gas off-take assembly 108, and solids off-take assembly 110. Specifically, as discussed more fully below, the junction 102 fluidly joins the feeder assembly 104 to the reciprocating reactor assembly 106, and the outer reactor zone 180 of the reciprocating reactor assembly 106 to the gas off-take assembly 108 and the solids off-take assembly 110.

The junction 102 is preferably airtight, and allows the material being processed in the system to be transferred from one assembly to another. The junction 102 includes a through path 112, and at least one exit branch through which gases and solids can exit the junction 102. Preferably, the junction 102 can have a plurality of exit branches, including at least one solids exit branch 114, and at least one gas exit branch 116. The through path 112 includes an inner passage 118 that is fluidly connected to the feeder assembly 104 and the reciprocating reactor assembly 106. The inner passage 118 can be used to convey carbonaceous feedstock from the feeder assembly 104 to the reciprocating reactor assembly 106. The through path 112 also includes an outer passage 120 that is fluidly connected to at least one exit branch. As shown in FIG. 2, the outer passage 120 can surround the inner passage 120, and can be fluidly connected to the solids exit branch 114 and the gas exit branch 116. The outer passage 120 can be used to convey gases and solids from the reciprocating reactor assembly 106 to the gas off-take assembly 108 and the solids off-take assembly 110. In the example illustrated in FIG. 2, the solids exit branch can be at the bottom of the junction 102, and the gas exit branch 116 can be at the top of the junction 102. Such a configuration can be obtained by having the junction 102 include a cross shaped pipe.

The feeder assembly 104 is configured to receive carbonaceous feedstock 204 and convey it to the junction 102. Carbonaceous feedstock 204 can be introduced into the continuous pyrolysis system 100 through the feeder assembly 104. The feeder assembly 104 can include one or more feedstock input airlocks 122 that can receive carbonaceous feedstock 204 from an outside source, a feed chamber 124 configured to receive carbonaceous feedstock 204 from the one or more feedstock input airlocks 122, a feed auger 126 having a drive assembly 128 and seal 146, and a first junction connection 130, which is airtight, to the inner passage 118 of the junction 102. The feed auger 126 can be shaftless because shaftless augers are known within the art to be able to convey heterogeneous and even sticky feedstocks. Furthermore, having a hollow core gives much greater room for gas flow as explained below. The feed auger 126 can be configured to convey carbonaceous feedstock 204 from the feed chamber 124 to turnaround zone 164 through the inner reactor zone 178 of the reciprocating reactor assembly 106. The feed auger 126 can extend through the feed chamber 124, through the inner passage 118 of the junction 102, and along a substantial portion of the length of the inner reactor pipe 152 of the reciprocating reactor assembly 106. Preferably, the feed auger 126 can extend along substantially all of the length of the inner reactor pipe 152, and inside the majority of the reciprocating reactor assembly 106 length. Further, the feed auger 126 can be reinforced to maintain stiffness under the desired operating conditions. The feed chamber 124 can be constructed with one or more pipe tee fittings 134 arranged in series, each with its own input airlock 122 sealed to the top of the tee fitting. Each tee of the feeder assembly 104 can also include at least one height extension 136, and at least one feed hopper 138 that can direct carbonaceous feedstock 204 from an outside source into each input airlock 122.

In the case of use of lock hopper airlocks, each pipe tee fitting 124 and height extension 136 can be sized to accommodate a feedstock buffer above the feed auger 126 that is large enough to maintain high fill levels of the feed auger 126 between airlock 122 discharge cycles. Also, if multiple airlocks 122 are included, the portion of the feed auger 126 underneath the airlocks 122 can have a varied pitch to allow for taking roughly the same volume of carbonaceous feedstock 204 from each airlock. For example, if there are two airlocks 122, as illustrated in FIG. 1, the portion of the feed auger 126 under the airlock farthest from reciprocating reactor assembly 106 can be designed to take about 50% of the desired throughput. The portion of the feed auger 126 under the airlock closest to the reciprocating reactor assembly 106 can take 100% of the desired throughput. With 50% of the feed auger 126 capacity already filled from the airlock 122 furthest from the reactor, the additional 50% will be taken from the airlock 122 closest to the reactor in order to obtain a total of 100% of the desired throughput. If there were three airlocks 122, the portion of the feed auger 126 under each airlock 122 can be designed to take about 33%, 66%, and 100% of the desired throughput, respectively, starting from the furthest portion from the reactor 106. Such a division in the amount of carbonaceous feedstock 204 taken by each portion of the feed auger 126 can allow for the space underneath each airlock 122 to be used as a material buffer to facilitate a continuous flow of carbonaceous feedstock 204.

Each pipe tee fitting 134 can include a feed-leveling bar 140, which can be fixed perpendicular to the direction of the flow of the carbonaceous feedstock 204, to stop carbonaceous feedstock 204 from riding along on top of a moving pile.

A feed assembly cap 142 can be attached to an end opening 144 on the pipe tee 134 that is farthest from the junction 102. The feed assembly cap 142 can attach to a high-pressure feed end seal 146, and the feed auger drive shaft 148 of the feed auger drive assembly 128 can pass through the feed assembly cap 142 and the high-pressure feed end seal 146 and operatively connect to the feed auger 126. One method of achieving a high-pressure seal is by use of a single or double-mechanical seal.

The feed chamber 124 can also include one or more eccentric reducers 150 located between the pipe tee fitting 134 closest to the reactor 106 and the first junction connection 130 to the inner passage 118 of the junction 102. The one or more eccentric reducers 150 can be aligned to maintain an even bottom surface for the feed auger 126 to rest upon. The one or more eccentric reducers 150 can function to "step down" the inner diameter of the feed chamber 124 so that the inner diameter of the feed chamber 124 at the first junction connection 130 is roughly equal to the inner diameter of the inner reactor pipe 152. Additionally, or alternatively, extender piping can be used to create distance between the feed chamber 124 and the junction 102. If desired, a heat source may be applied to outer surface of the extender pipe to pre heat the feedstock.

Figure 3:
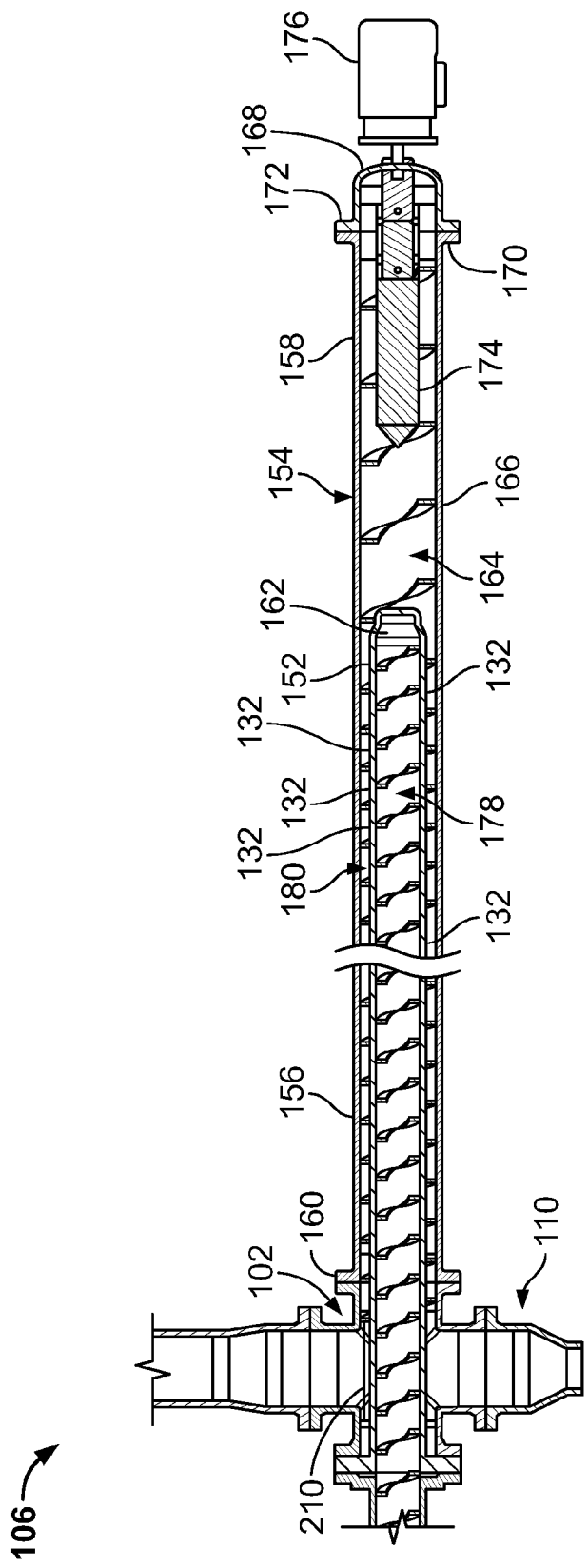
FIG. 3 illustrates one example of a reciprocating reactor assembly for use in the continuous pyrolysis system of FIG. 1.

As shown in FIGS. 1 and 3, reciprocating reactor assembly 106 is configured to receive carbonaceous feedstock 204 and react the carbonaceous feedstock 204 to produce product gases and product solids, the reciprocating reactor assembly 106 includes an inner reactor pipe 152 and an outer reactor pipe 154, the outer reactor pipe having a first portion 156 that surrounds the inner reactor pipe forming an annulus space, and a second portion 158 that extends beyond the inner reactor pipe 152 and forms a turnaround zone 164. As discussed in detail below, the inner reactor pipe 152 provides an inner reactor zone 178 and the annulus space provides an outer reactor zone 180.

The inner reactor pipe 152 can be integrally or fluidly connected to the inner passage 118 of the junction 102. The inner reactor pipe 152 can include one or more, and preferably a plurality of, gas ports 132. The inner reactor pipe 152 can have an air tight connection to the feed chamber side of the junction 102 and extend through the junction to create the inner passage 118, or it can be attached to a separately constructed inner passage at the transition area between 160 the junction and the reciprocating reactor.

The outer reactor pipe 154 can be concentric or substantially concentric with the inner reactor pipe 152. The first portion 156 of the outer reactor pipe 154 surrounds the inner reactor pipe 152, and is fluidly connected to the gas off-take assembly 108 and the solids off-take assembly 110 via the junction 102. The outer reactor pipe 154 can have an airtight connection to the junction 102 at second junction connection 160. The second portion 158 of the outer reactor pipe 154 extends beyond the exit end 162 of the inner reactor pipe 152, so that it does not surround the inner reactor pipe 152, and forms the turnaround zone 164.

The reciprocating reactor assembly 106 can further include a return auger 166, which can be a shaftless auger, that extends from the turnaround zone 164 of the second portion 158 of the outer reactor pipe 154 to the junction 102, the return auger 166 being configured to convey partially reacted carbonaceous feedstock from the turnaround zone 164 to the gas off-take assembly 108 and the solids off-take assembly 110. The return auger 166 can be reinforced to maintain stiffness under the desired operating conditions and so that the return auger 166 can support the weights of the inner reactor pipe 152 and the portion of the shaftless feed auger 126 that extends within the inner reactor pipe 152. In such examples, the inner and outer friction surfaces of the return auger 166 can preferably be designed to have as little friction as possible. Also, the return auger 166 can be sized to provide the closest feasible tolerance with respect to the inside wall of the outer reactor pipe 154.

A return assembly cap 168 can be attached to the end opening 170 on the outer reactor pipe 154 that is farthest from the junction 102. The return assembly cap 168 can attach to a high-pressure reactor end seal 172, and the return auger drive shaft 174 of the return auger drive assembly 176 can pass through the return assembly cap and the high-pressure reactor end seal 172 and operatively connect to the return auger 166. As with the high-pressure feed seal 146, a high-pressure seal can be achieved by using a single or double-mechanical seal. However, the high-pressure reactor end seal 172 can preferably also be a high-temperature seal, which can be formed by a double-mechanical seal. If temperature is a problem with the particular seal chosen, a cooling system and/or other temperature control system can be installed.

A compressed air inlet port having an internal injection nozzle can be added to the wall of the turnaround zone 164 for injecting outside air to facilitate combustion during circumstances where additional system heat is desired. The internal injection nozzle can extend off the inside surface of the outer reaction pipe 154 so that flame created when air is injected into the turnaround zone 164 does not overheat the reactor wall near the port. To allow for an internal injection nozzle inspite of the rotating return auger 166, a notch configured to pass over the internal injection nozzle can be cut into the return auger 166, as long as too much strength is not lost in the return auger 166.

In practice, the volume inside the inner reactor pipe 152 forms an inner reactor zone 178, and the volume of the first portion 156 of the outer reactor pipe 154 that surrounds the inner reactor pipe 152, which is defined by the annulus space between the outer wall of the inner reactor pipe 152 and the and the outer reactor, forms an outer-reactor zone 180. The turnaround zone 164 fluidly connects the inner reactor zone 178 and the outer rector zone 180. Partially reacted carbonaceous feedstock can travel through the inner reactor zone 178 of the inner reactor pipe 152, exit the inner reactor pipe 152 through its exit end 162 into the turnaround zone 164, and then reverse direction to travel through the outer reactor zone of the first portion of the outer reactor pipe 156 to the junction 102. In some examples of the present technology, the outer reactor pipe 156 can be fixed with a common "water jacket" and radiator assembly to extract excess heat from the gases and solids in the outer reactor zone 180 to facilitate both heat recovery and gas dehumidification through condensation. A mass and energy balance of the intended use of the system can be used to determine the sizing of the water jacket and radiator system.

The diameters of the inner reactor pipe 178 and the outer reactor pipe 156 can be sized as appropriate to accommodate the conveyance of solids and gas flow at the desired temperature, pressure, and solids fill level of the reciprocating reactor assembly 106. The return augur 166 within the outer reactor zone 180 can be affixed with paddles to facilitate backfilling the exiting solids in order to maintain high fill level within outer reactor zone 180. Furthermore, the portion of the return auger 166 in the turnaround zone 164 can be made with greater pitch than that within the outer reactor zone 180 in order to maintain low fill levels in the turnaround zone 164.

The material, thickness, and length of the inner reactor pipe can be chosen based on balancing the often conflicting goals of maximizing the heat exchange capacity and minimizing the costs associated with required replacement and service intervals given planned operation conditions. A concentric reducer can be added to the exit end 162 of the inner reactor pipe 152 to facilitate the redirection of carbonaceous feedstock by the return auger 166.

The material and thickness of the outer reactor pipe 154 can be chosen to withstand the expected operational conditions. The length of the second portion 158 of the outer reactor pipe 154 can be chosen to ensure that the turnaround zone 164 provides enough space for the partially reacted carbonaceous feedstock exiting the exit end 162 of the inner reactor pipe 152 to be acted upon by the return auger 166.

The end of the return auger 166 inside the junction 102 can include one or more agitator bars 210 that rotate parallel with the return auger's axis and act with gravity to facilitate solids movement into the solids off-take assembly 110.

Figure 4:
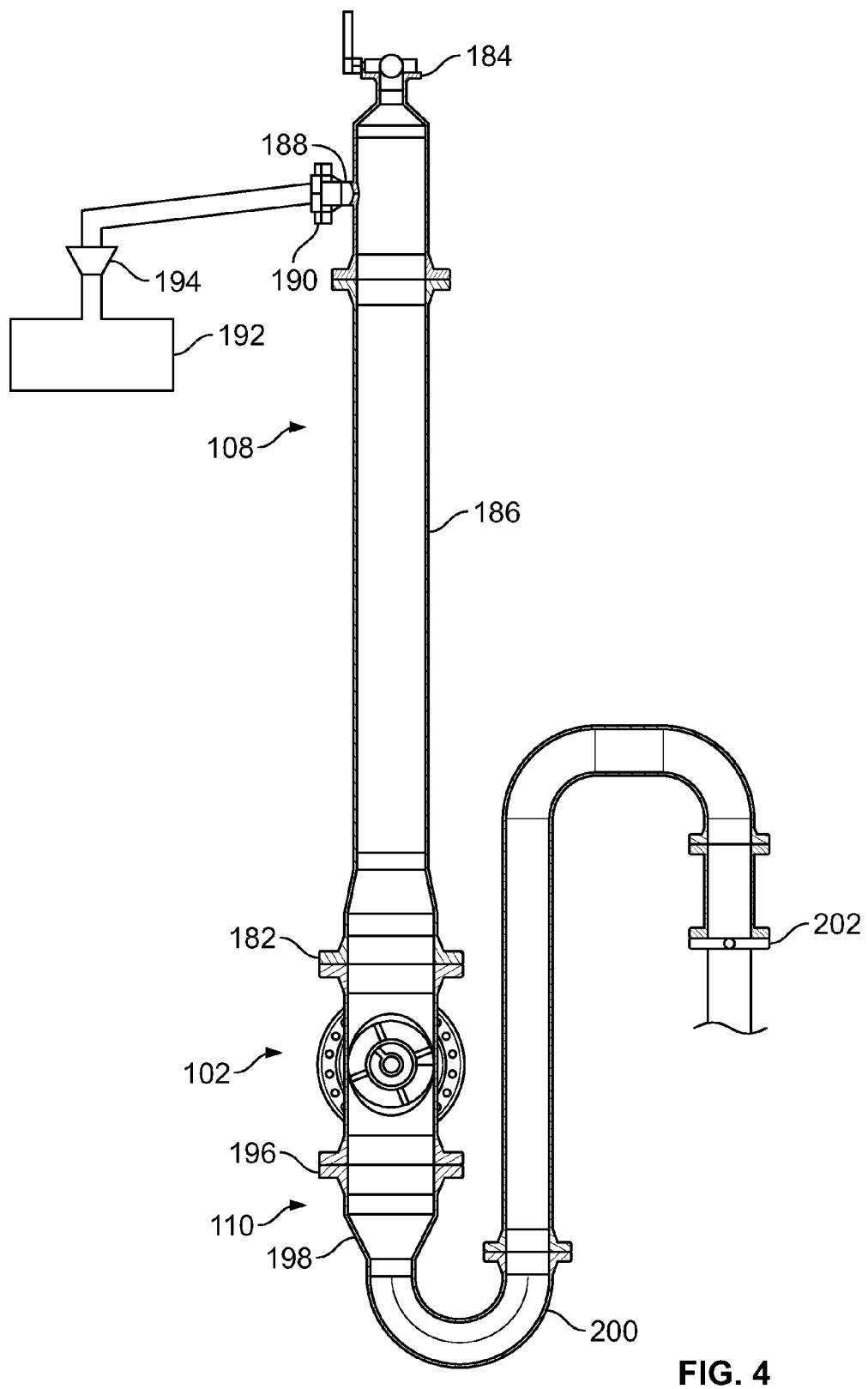
FIG. 4 illustrates one example of a gas off-take assembly and a solids off-take assembly for use in the continuous pyrolysis system of FIG. 1.

Referring to FIGS. 1 and 4, the gas off-take assembly 108 is fluidly connected to the junction 102, and thus to the outer reactor zone 180 of the reciprocating reactor assembly 106, at third junction connection 182, which can be an airtight connection. The gas off-take assembly 108 is configured to remove product gases 206 from the continuous pyrolysis system 100. The gas off-take assembly 108 includes a gas flow control valve 184 at the top of the gas off-take assembly 108, which regulates the flow of product gases 206 out of the gas off-take assembly 108. In some examples, the gas off-take system 108 can also include a scrubbing tower 186 between the third junction connection 182 and the gas flow control valve 184. The scrubbing tower can include a fluid injection port 188 near the top of the scrubbing tower 186, and a nozzle assembly 190 that injects liquid through the fluid injection port 188 into the scrubbing tower 186. In practice, product gases 206 can rise from the junction 102 up through the scrubbing tower 186 to the gas flow control valve 184 to exit the gas off-take assembly 108, while liquid injected by the nozzle assembly 190 into the scrubbing tower 186 can fall down through the scrubbing tower 186, counter-current to the product gases 206. The nozzle assembly 190 can be operatively connected to a liquid source 192 and an injector pump 194 that provides the liquid from the liquid source 192 to the nozzle assembly 190. The liquid can be a suitable liquid, such as water. The injected liquid can cool, clean, dehumidify, and extract carbon dioxide to upgrade the gas.

The solids off-take assembly 110 is fluidly connected to the junction 102, and thus to the outer reactor zone 180 of the reciprocating reactor assembly 106, at fourth junction connection 196, which can be an airtight connection. The solids off-take assembly 110 is configured to remove product solids

208 from the continuous pyrolysis system 100. The product solids 208 can include biochar, and can also include liquid derived from condensed product steam and any additional liquid that may have been injected into the system to make up a flowable slurry. The solids off-take assembly 110 can include a funnel 198, flow plumbing 200 connected to the funnel 198, and a flow control valve 202 connected to the flow plumbing 200, which regulates the flow of product solids 208 out of the solids off-take assembly 110. The flow plumbing 200 can convey product solids 208 from the funnel 198 to the flow control valve 202. The funnel 198 can be of sufficient size to create a pressure seal with a pool of slurry formed from product solids 208 and liquid. For example, the solids off-take assembly 110 can be fluidly connected to the gas off-take assembly 108 by the junction 102, and liquid injected into the scrubbing tower 186 can fall through the junction 102 into the solids off-take assembly 110.

In some examples, a continuous pyrolysis system of the present technology can include a control system for operating, regulating, and controlling the various components of the system. The controls mechanisms for such a control system can be automated using controls technology and methods already known in the art. A control system can include, for example, pressure and temperature sensors, level switch sensors in the slurry pool, gas flow rate sensors and regulators, solenoids, devices that can start, stop, and vary the speeds and operating conditions of all the motors, an air injection port through the outer reactor pipe 154 near the inner reactor pipe 152 exit end 162, an air compressing device to inject air into the turnaround zone 164, a control computer and enabling equipment and algorithms to receive and process inputs and send and deliver output signals required to appropriately control system function.

To achieve steady-state operation, such a control system can be used to act upon several available control variables.

Solids residence time can be controlled by the rate of rotation for the feed auger 126 and the return auger 166. Gas residence time can primarily be controlled by the pressure and temperature of the system, rate of air injection (if any), solids residence time, system reaction environment, and rate at which gas is pulled out of the machine.

Varying pressure slightly can have a major impact on the gas densities inside the reciprocating reactor assembly 106. Therefore, if the temperature inside the reciprocating reactor assembly 106 is too hot, increasing the opening of the gas flow control valve 184 at the top of the gas off-take assembly 108 can decrease the pressure inside the reciprocating reactor assembly 106, which can increase the velocity of the gas due to its greater volume requirements. The increase in velocity can decrease the gas's residence time, which can decrease the amount of heat transfer between the gases and the biochar and carbonaceous feedstock particles. Because of this, the gas can come out hotter than it would have at the higher pressure, thus reducing the overall temperature in the reciprocating reactor assembly 106.

In addition to the off-take rates of product solids 208 and product gases 206, the temperature of a continuous pyrolysis system of the present technology can be regulated by varying the rate of carbonaceous feedstock 204 input. This is possible because the amount of heat that transfers from the outgoing products to the incoming products is dependent on the amount of time each carbonaceous feedstock 204 particle spends in contact with the heat transfer medium. Accordingly, if the temperature is too hot, increasing the throughput rate can translate to less residence time in the reciprocating reactor assembly 106, which, in turn, can translate to less heat transfer between outgoing biochar and the incoming carbonaceous feedstock 204. The converse can be true for decreasing the throughput in order to increase the temperature.

If desired, the heat and pressure in the reciprocating reactor assembly 106 can also be regulated by injecting pressurized air into the turnaround zone 164 in a controlled way. This can cause a small portion of biochar and gas to oxidize and, thus, release extra heat, raising the temperature and the pressure. This method can be employed whenever the continuous pyrolysis system 100 needs either heat or pressure, thus ensuring sufficient heat and pressure to maintain steady-state operation even when some pressure and heat is lost to inherent system operational inefficiencies. This method is particularly useful in combating temperature drops associated with peaks in the fluctuation of the moisture content of the carbonaceous feedstock. However, it is recommended that care be taken to ensure that this method is used in conjunction with the other methods, since too much air injection can dilute the product gases 206 with too much nitrogen. Pure oxygen can be injected instead, but adds substantial extra expense and complexity to the system.

Figure 5:
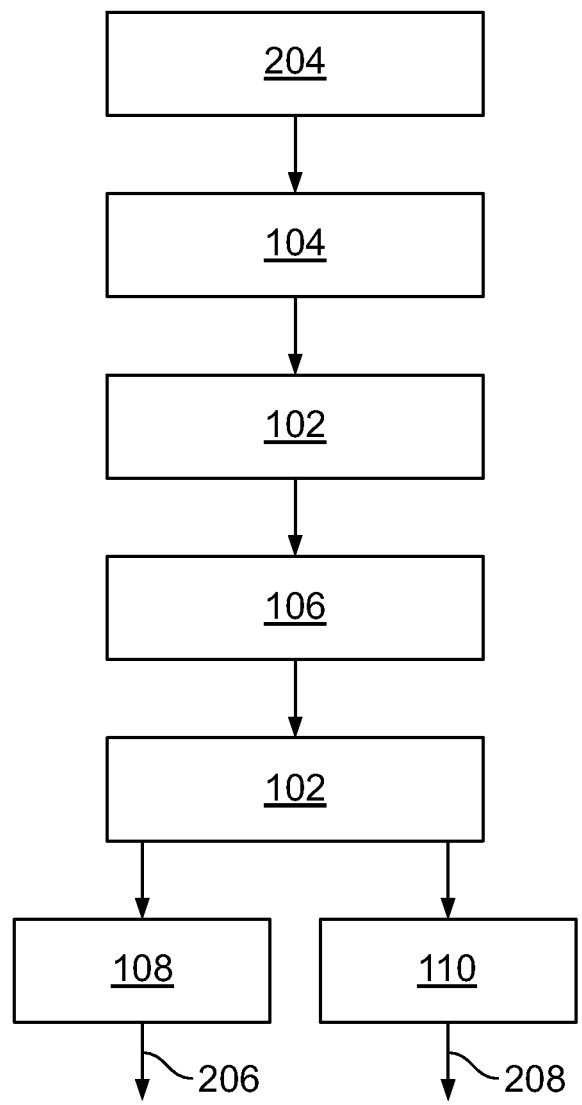
FIG. 5 is a schematic flow diagram of one example of a continuous pyrolysis system of the present technology.

Referring to FIGS. 1 and 5, methods of the present technology can include providing carbonaceous feedstock 204 to the feeder assembly 104, passing the carbonaceous feedstock from the feeder assembly 104 to the junction 102, passing the carbonaceous feedstock from the junction 102 to the reciprocating reactor assembly 106, reacting the carbonaceous feedstock 204 in the reciprocating reactor assembly 106 to form product gases 206 and product solids 208, passing the product gases 206 and product solids 208 from the reciprocating reactor assembly 106 to the junction 102, passing the product gases 206 from the junction 102 to a gas off-take assembly 108, passing the product solids 208 from the junction 102 to a solids off-take assembly 110, removing product gases 206 from the continuous pyrolysis system 100 through the gas off-take assembly 108, and removing product solids 208 from the continuous pyrolysis system 100 through the solids off-take assembly 110.

As discussed above, the junction 102 can include a through path 112, which can have an inner passage 118 that is fluidly connected to the feeder assembly 104 and the reciprocating reactor assembly 106, and an outer passage 120 that is fluidly connected to the gas off-take assembly 108 and the solids off-take assembly 110. Accordingly, the step of passing the carbonaceous feedstock from the feeder assembly 104 to the junction 102 can include conveying the carbonaceous feedstock to the inner passage 118 of the junction 102. Additionally, the step of passing the product gases 206 and product solids 208 from the reciprocating reactor assembly 106 to the junction 102 can include conveying the product gases 206 and product solids 208 from the reciprocating reactor assembly 106 to the outer passage 120 of the junction 102.

Also as discussed above, the reciprocating reactor assembly 106 can include an inner reactor pipe 152 that provides an inner reactor zone 178, and an outer reactor pipe 154 having a first portion 156 that surrounds the inner reactor pipe 152 to form an annulus space that provides an outer reactor zone 180 and a second portion 158 that extends beyond the inner reactor pipe 152 and forms a turnaround zone 164. Accordingly, the step of reacting the carbonaceous feedstock 204 in the reciprocating reactor assembly 106 in methods of the present technology can include conveying the carbonaceous feedstock through the inner reactor zone 178, the turnaround zone 164, and the outer reactor zone 180.

In the example shown in FIG. 5, one method of the present technology can begin by providing a carbonaceous feedstock 204 to a feed hopper 138 that can direct carbonaceous feedstock 204 from an outside source into each input airlock 122.

Each airlock can function to pass the carbonaceous feedstock 204 from the atmosphere to the feed chamber 124, which is preferably pressurized. In various examples, lock hoppers, rotary airlocks, piston feeders, or any similar device can be employed with its supporting equipment to load the system. One preferred type of airlock 122 is a lock hopper comprised of two knife gates with a pressurization chamber in between them. The carbonaceous feedstock 204 can drop by gravity into the feed chamber 124, and can then be conveyed from the feed chamber 124 to the inner passage 118 of the junction 102, and then from the inner passage 118 of the junction 102 to the inner reactor pipe 152.

There are several simultaneous processes that occur within the reciprocating reactor and junction.

The steady-state solids mass flow are described first and provide context for the relevant phase changes, reactions, gas flow, and heat flow. The relevant solids mass flow starts with the carbonaceous feedstock 204 entering the inner reactor pipe 152 and being conveyed through the inner reactor zone 178 of the inner reactor pipe 152 by the feed auger 126, producing partially reacted carbonaceous feedstock 204. When partially reacted carbonaceous feedstock 204 reach the end of the inner reactor zone 178 it drops into the turnaround zone 164. In the turnaround zone 164 the partially reacted carbonaceous feedstock 204 is acted upon by the return auger 166, which conveys the partially reacted carbonaceous feedstock 204 from the turnaround zone 164 through the outer-reactor zone 180 back toward the junction 102, to the gas off-take assembly 108 and the solids off-take assembly 110. The rotation rate of the return auger 166 can be fast enough to keep the turnaround zone 164 from filling up.

The system pressure, thermal heat transfer and gas flow can all interrelate. The system pressure can be self-perpetuating due to the gases released in the thermal conversion reactions within the reciprocating reactor assembly 106, the vaporizing of any moisture from the carbonaceous feedstock 204 within a confined volume, and the controlled release of product gases through the gas off-take assembly 108. To lower the pressure within the system, more gas can be allowed to escape than is being produced until the desired pressure is reached. To build pressure, less gas than is produced can be released. The appropriate pressure can be dependent on feedstock and desired product outcome.

Pressurization can increase thermal efficiency of the system due to several reasons. Pressure tends to compress the gases, which, in turn, tends to enhance convective heat transfer between the gases and solids. Also, by virtue of gas compression, pressurization can increase residence time within the reciprocating reactor assembly 106. Increased residence time, coupled with the design of the reciprocating reactor assemblies of the present technology, can facilitate high gas/solids interactions, allowing for gases to more fully approach chemical equilibrium prior to exiting. Relatedly, pressurization can decrease gas flow velocity within the reciprocating reactor assembly 106, allowing for higher throughputs without reaching critical gas velocities inside a given reactor geometry.

Additionally, high reactor pressure can facilitate thermal conversion to begin at lower temperatures. Also, pressurization can increase the temperature at which the steam within the system condenses. This can benefit the conductive heat transfer across the wall of the inner reactor pipe 152 since once the gas reaches the condensation temperature at the given pressure the gas can continue to release energy to the incoming carbonaceous feedstock 204 without lowering temperature, thus maintaining the temperature gradient between the inner reactor zone 178 and the outer reactor zone 180. The reciprocating reactor assembly 106 can have a length that is selected to be long enough to allow the condensation temperature to be reached in the outer reactor zone 180, and to allow sufficient condensation to occur within the outer reactor zone 180 while energy is being transferred to the incoming feedstock to create a sustainable reaction. The more efficient the reciprocating reactor assembly 106 is for a given throughput, the less thermal energy will be contained in the remaining solids when it reaches the condensation zone and the more liquid water will mix with remaining solids prior to exiting the system 100. The more water condensed within the system, the less combustion required. There can be enough condensable product steam in the pyrolysis reaction of carbonaceous feedstocks that there is sufficient heat to recycle so that no combustion is required.

To facilitate better heat transfer from the outer reactor zone 180 to the inner reactor zone 178, gas ports 132 can be made through the walls of the inner reactor pipe 152, preferably near the junction end of the inner reactor zone 178 but outside of the junction 102. The gas ports 132 can create a gas flow path of least resistance in a direction opposite to the flow direction of the carbonaceous feedstock 204. Gases created in the inner reactor zone 178, and to a lesser extent in the outer reactor zone 180, have two possible exits from the inner reactor zone 178. First, gases can leave through the gas ports 132 in the wall of the inner reactor pipe 152. Second, gases can enter the turnaround zone 164 and travel the full length of the outer reactor zone 180. Preferably, a sufficient number of gas ports 132 can be provided to ensure a desired level of reverse flow of gases. Because the gases within the reciprocating reactor assembly tend to be approximately the same temperature as the feedstock particle that created it, and the feedstock particles that create gases are generally hotter than those further back in inner reactor zone 178, the gases in the inner reactor zone 178 tend to release their heat as they travel in the reverse flow direction and come in contact with cooler feedstock particles.

As the gases cool, they give up energy to upstream feedstock particles and the volume of the gases decreases. This can create a syphoning effect, offering the gases being created closer to the turnaround zone more space to occupy. Because the cooler carbonaceous feedstock is always moving downstream and a large portion of hotter gases are moving upstream against the carbonaceous feedstock, the heat in the gas is effectively recycled to the incoming carbonaceous feedstock. Because the gas contains substantial portions of hot $CO_2$ and steam, the gas flow through the solid material can help "activate" it. In the case of producing charcoal, the gas can partially activate the product charcoal particles and make it easier to convert the product charcoal into activated carbon. This is similar to the traditional practice of steam activation used in the manufacture of activated carbon.

As the gases flow over the reacting particles of carbonaceous feedstock 204, most of the tars and other condensable gases in the product gases can be cracked. This cracking tends to be very exothermic and can result in cleaner product gases exiting the reciprocating reactor assembly 106. Any remaining tars in the product gases that are not at first pass cracked in the inner reactor zone 1784 as they travel backward can either exit the inner reactor zone 178 through the gas ports 132 to come into contact with significantly hotter finished char for cracking, or merely condense on the surface of a feedstock particle that will then carry it back into the hot end of the inner reactor zone 178 for one or multiple vaporization cycles until it cracks or leaves through the gas ports.

In terms of where on the length of the inner reactor pipe 152 the gas ports 132 should be located, the placement is preferably far enough along the inner reactor pipe 152 so that carbonaceous feedstock 204 has already evaporated its latent moisture and has begun to breakdown before passing the end of the gas ports 132. This location for the gas ports 132 is the same as the point between thermal stages one and two which are described below. This is because the tarry vapors in the gas are less likely to have fully decomposed at the temperatures seen in the early stages of the reaction. The number, size and shape of the gas ports 132 can be selected to facilitate sufficient gas flow without allowing substantial particle loss to the outer reactor zone 156. The gas flow through the gas ports 132 can be enough to avoid biomass "blow out" into the turnaround zone 164 from too much gas developing within the inner reactor zone and being pushed substantially faster than the feed auger conveys the feedstock. Ideally, the return auger and gas ports 132 can be designed to minimize gas flow in the portion of the outer reactor zone 180 that is located past the gas ports 132. This will ensure reverse flow of gas against the direction of the carbonaceous feedstock 204 in the inner reactor zone 178 and enhance heat transfer within the reciprocating reactor assembly 106.

The thermal heat associated with the continuous pyrolysis reaction that occurs within the system 100 tends to come from three primary sources: 1) heat transfer through the wall of the inner reactor pipe 152, recycled from the product solids and gases exiting the reactor in the outer reaction zone 180, 2) the thermal conversion reactions that the carbonaceous feedstock 204 undergoes within the reciprocating reactor assembly 106, and 3) any combustion caused by latent or added oxygen. The majority of the thermal conversion within the reciprocating reactor assembly 106, and resulting gas production, can happen within the inner reactor zone 178. The thermal conversion reactions can include evaporation, pyrolysis, gasification, and a small amount of combustion. Though the carbonaceous feedstock 204 may begin to heat up somewhat in the feeder chamber 124, most temperature change tends to occur within the inner reactor zone 178. The temperature within the reciprocating reactor assembly 106 tends to reach a peak at a location toward the end of the inner reactor zone 178, or shortly thereafter in the turnaround zone 164, or in the beginning portion of the outer reaction zone 180.

The carbonaceous feedstock 204 can undergo four somewhat overlapping temperature conversion stages that roughly correspond to knowable temperature ranges. The first stage can happen as the temperature rises from the input temperature to the pressure-adjusted vaporization temperature of water. The second stage can begin at the onset of pyrolysis, when the input carbonaceous feedstock 204 is dry, and can last until exothermic pyrolysis begins. The third stage is the exothermic pyrolysis stage. The fourth "finishing" stage can be optional and can be dependent upon whether a desired peak temperature above that reached in stage three is maintained for sufficient time. If required, additional heat for the finishing stage can be supplied by a small amount of combustion.

The first stage can begin when the carbonaceous feedstock 204 first enters the inner reactor zone 178, where it comes into contact with the hot metal of the walls of the inner reactor pipe 152. The wall of the inner reactor pipe 152 can act as a heating surface conducting heat into the carbonaceous feedstock 204 from the product solids 208 exiting the reciprocating reactor assembly in the outer reactor zone 180. Any latent moisture in the carbonaceous feedstock 204 can begin to evaporate when it reaches the pressure-adjusted vaporization temperature of water. Until mostly all latent water is evaporated the temperature of the feedstock remains roughly at water's vaporization temperature.

The second stage can begin as the carbonaceous feedstock 204 reaches pyrolysis temperature and begins to thermally decompose. Pyrolysis at this stage can be an endothermic reaction and relies on recycled heat to increase its temperature to the next stage. The carbonaceous feedstock 204 reaches a tipping point where it becomes exothermic, which signals the transition to the third stage.

The exothermic tipping point is dependent on the type of carbonaceous feedstock 204 and rector pressure, but for wood biomass it is roughly between about 270° C. and about 290° C. at atmospheric pressure. This exothermic portion of pyrolysis reaction is important to creating a thermally self-sustaining reaction. However, for practical purposes, it is not enough alone to achieve a steady-state process. The exothermic primary and secondary pyrolysis reactions can combine with the heat conduction from the outer reactor zone 180 to reach steady state.

The product gases created in the reciprocating reactor assembly 106 can be forced out via pressure gradient to the gas flow control valve 184 of the gas off-take assembly 108. The amount of gas escaping the system 100 can be varied by opening and closing the opening of the gas flow control valve 184.

The product solids created in the reciprocating reactor assembly 106, as well as product water can be removed through the solids off-take assembly 110. In some examples, a slurry is formed that contains the product solids and product water, and can also contain water injected from the gas off-take assembly 108 which collects in a pool below the junction 102 in the solids off-take assembly 110. This pooling of slurry can create a pressure seal. The injected water can assists the return auger's agitator bars in the discharge of the solids. The amount of injected water can preferably be sufficient to create a pooling of slurry on top of the flow control valve 202 that is replenished roughly as fast as it flows out the bottom. The injection rate of injected water can be maintained at a level to ensure a flowable slurry mixture for the given solids characteristics. Enough slurry can be allowed to flow out of the system 100 through the flow control valve 202 to maintain steady state operation of the apparatus.

In some examples, a water recycling system to can be used to dewater the slurry, and the extracted water can be to feed back into the water injection system. In this instance, de-carbonization and cooling of the water is necessary to maintain gas upgrading benefit, which can be accomplished by bubbling ambient air through the water.

EXAMPLE 1

Start Up

One example of a start-up procedure for a continuous pyrolysis system and process of the present technology is as follows:

1. All airtight connections are closed except for the gas flow control valve 184 of the gas off-take system 108.
2. Biochar is loaded into the continuous pyrolysis system 100 through the feed assembly 124, the amount of biochar being sufficient to fill the outer reactor zone 180.
    a. The last portion of biochar loaded is soaked with a small amount of slow-burning accelerant (e.g., diesel fuel). If biochar is left in the reactor from the last run, the slow-burning accelerant can be applied to the incoming biomass only.
    b. After stopping loading the biochar, the continuous pyrolysis system 100 continues to convey the biochar through the inner reactor zone 178 and into place in the outer reactor zone 180 with the slow-burning accelerant soaked portion of biochar positioned in the turnaround zone 164.
3. After loading of the biochar, the return auger 166 is stopped while the feed auger 126 continues to rotate.
4. Next, a lit flare is loaded into the feed chamber 124 and conveyed into the reciprocating reactor assembly 106 followed with enough carbonaceous feedstock 204 loaded in the system to fill the inner reactor zone 178.
   a. A portion of carbonaceous feedstock 204 a few feet behind the flare (in the inner reactor zone 178) is also doused with slow-burning accelerant to assist in the start up.
5. The feed auger 126 continues to operate until the portion of biochar soaked with slow-burning accelerant ignites.
   a. Thermocouples and pressure transducers in the reactor can detect when ignition occurs and stop the feed auger 126.
6. When combustion starts the exhaust created generates system pressure that begins to flow to the only gas outlet, the gas flow control valve 184 of the gas off-take system 108.
7. The gas flow control valve 184 of the gas off-take system 108 can be adjusted, or can automatically adjust, to accommodate all necessary flow of combustion exhaust out of the system.
   a. During startup, the exhaust is directed into a ground flare system that is fitted with a propane, or other gaseous fuel, booster system to ensure a continuous flame during startup.
8. Combustion can be facilitated by the injection of compressed air through a port in the second portion of the outer reactor pipe 158 into the turnaround zone 164. The amount of compressed air injected is controlled to only accommodate a slow burn.
9. The heat created during combustion is transferred to neighboring and downstream biochar, carbonaceous feedstock, and metal parts of the continuous pyrolysis system 100. Much of the heat is also carried in the combustion exhaust and transferred to downstream biochar, carbonaceous feedstock, and metal parts of the continuous pyrolysis system 100 through convection.
   a. This creates a chain reaction that will continue until all the biochar and some of the carbonaceous feedstock is burned.
10. Once the carbonaceous feedstock 204 inside the inner reactor zone 178 reaches exothermic pyrolysis temperature, new carbonaceous feedstock starts to get loaded into the feed chamber 124 and the feed auger 126 is turned on again.
11. The biochar's properties allow it to burn at a much faster rate than the carbonaceous feedstock 204 so the outer reactor zone 180 heats up faster than the inner reactor zone 178.
   a. This ensures that the outer reactor pipe 154 components will expand and elongate ahead of the inner reactor pipe 152 components, thereby making room for the inner reactor pipe 152 components to expand and elongate.
   b. Accommodating the material expansion in this way allows for tight tolerances in the design of the reactor components.
12. During start-up mode, the temperature of the continuous pyrolysis system 100 is allowed to rise to a much higher temperature than that desired for pyrolysis, so as new carbonaceous feedstock enters the system it raises to temperature much more quickly than at the cooler, pyrolysis temperature.
13. The gas off-take system 108 starts to restrict flow of the gas leaving the reactor, thereby raising the pressure of the reciprocating reactor assembly 106. The pressure is controlled to ensure that the pressure is held below the ability of the reciprocating reactor assembly 106 to safely contain it at its measured temperature.
14. To facilitate the reciprocating reactor assembly 106 accommodating the desired pressure, the continuous pyrolysis system 100 decreases the temperature by slowly tapering off the compressed air feed. As the temperature cools down to the desired operating temperature, somewhere between 300° C. and 900° C., the pressure is allowed to build to operating pressure.
15. The return auger 166 is turned on when enough water has been condensed out of the gas or injected to maintain the pressure seal in the solids off-take assembly 110.

EXAMPLE 2

Shut Down

One example of a shutdown procedure for a continuous pyrolysis system and process of the present technology is as follows:
1. Feeding of carbonaceous feedstock into the feeder assembly is ceased.
2. The feed auger 126 and return auger 166 are operated until the gases and biochar exit the system.
3. The feed auger 126 and return auger 166 are shut off.
Alternatively, particularly where the expected time offline is short and the reactor does not need to be disassembled:
1. Feeding of carbonaceous feedstock into the feeder assembly is ceased.
2. The feed auger 126 and return auger 166 are operated until the all of the carbonaceous feedstock in the system reaches the outer reactor zone 180.
3. The feed auger 126 and return auger 166 are shut off, and the biochar is allowed to cool to be ready for the next start up.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:
1. A continuous pyrolysis system comprising:
a feeder assembly through which a carbonaceous feedstock can be introduced into the continuous pyrolysis system;
a reactor assembly configured to receive the carbonaceous feedstock and react the carbonaceous feedstock to produce product gases and product solids, the reactor assembly comprising a fixed inner reactor pipe and a fixed outer reactor pipe, the outer reactor pipe having a first portion that surrounds the inner reactor pipe forming an annulus space and a second portion that extends beyond the inner reactor pipe and forms a turnaround zone, wherein the inside of the fixed inner reactor pipe defines an inner reactor zone that produces partially reacted carbonaceous feedstock and the annulus space defines an outer reactor zone that produces product gases and product solids;

a first conveyance means inside the feeder assembly and the fixed inner reactor pipe configured to move the carbonaceous feedstock through the feeder assembly and move the partially reacted carbonaceous feedstock and product solids through the fixed inner reactor pile and deposit the partially reacted carbonaceous feedstock into the turnaround zone;

a second conveyance means inside the fixed outer reactor pipe configured to receive the partially reacted carbonaceous feedstock and product solids in the turnaround zone and traverse the same back through the annulus space;

a gas off-take assembly fluidly connected to the outer reactor zone of the reactor assembly configured to remove product gases from the continuous pyrolysis system;

a solids off-take assembly fluidly connected to the outer reactor zone of the reactor assembly configured to remove product solids from the continuous pyrolysis system; and a junction that fluidly joins the feeder assembly to the reactor assembly, and the outer reactor zone to the gas off-take assembly and the solids off-take assembly.

2. The continuous pyrolysis system of claim 1, wherein the junction comprises a through path having an inner passage that is fluidly connected to the feeder assembly and the reactor assembly, and an outer passage that is fluidly connected to the outer reactor zone, the gas off-take assembly, and the solids off-take assembly.

3. The continuous pyrolysis system of claim 2, wherein the outer passage surrounds the inner passage, and the outer passage comprises a solids exit branch at a bottom of the junction that is fluidly connected to the solids off-take assembly, and a gas exit branch at a top of the junction that is fluidly connected to the gas off-take assembly.

4. The continuous pyrolysis system of claim 2, wherein the feeder assembly comprises:

one or more feedstock input airlocks that receive carbonaceous feedstock from an outside source;

a feed chamber configured to receive carbonaceous feedstock from the one or more feedstock input airlocks; and wherein the first conveyance means is a feed auger that extends through the feed chamber, through the inner passage of the junction, and along a substantial portion of the length of the inner reactor pipe of the reactor assembly, the feed auger being configured to convey carbonaceous feedstock from the feed chamber to the turnaround zone through the inner reactor zone of the reactor assembly.

5. The continuous pyrolysis system of claim 1, wherein the second conveyance means is a return auger that extends from the turnaround zone of the second portion of the outer reactor pipe to the junction, the return auger being configured to convey the partially reacted carbonaceous feedstock and product solids from the turnaround zone to the solids off-take assembly.

6. The continuous pyrolysis system of claim 1, wherein the inner reactor pipe comprises one or more gas ports along a length of the inner reactor pipe, the one or more gas ports being configured to allow gas to pass from the inner reactor zone to the outer reactor zone.

7. The continuous pyrolysis system of claim 1, wherein the gas off-take assembly comprises a gas flow control valve at a top of the gas off-take assembly, the gas off-take assembly being configured to regulate the flow of product gases out of the gas off-take assembly.

8. The continuous pyrolysis system of claim 1, wherein the gas off-take assembly comprises a scrubbing tower, the scrubbing tower including a fluid injection port near a top of the scrubbing tower and a nozzle assembly configured to inject liquid through the fluid injection port into the scrubbing tower.

9. The continuous pyrolysis system of claim 8, wherein the solids off-take assembly is configured to be below the scrubbing tower and in fluid communication with the scrubbing tower and comprises:

a funnel, flow plumbing connected to the funnel; and a flow control valve connected to the flow plumbing, wherein the flow control valve regulates the flow of a mixture of product solids and the liquid introduced through the nozzle assembly out of the solids off-take assembly.

10. The continuous pyrolysis system of claim 9, wherein the funnel is sized to create a pressure seal with a pool of product solids and liquid.

11. A method of continuous pyrolysis, the method comprising steps of:

Providing a carbonaceous feedstock to a feeder assembly;

passing the carbonaceous feedstock from the feeder assembly through a junction to an inner reactor zone of a reactor assembly comprised of a fixed inner reactor pipe and a fixed outer reactor pipe, the outer reactor pipe having a first portion that surrounds the inner reactor pipe forming an annulus space and a second portion that extends beyond the inner reactor pipe and forms a turnaround zone, wherein the inside of the fixed inner reactor pipe defines the inner reactor zone and the annulus space defines an outer reactor zone;

reacting the carbonaceous feedstock in the inner reactor zone to form partially reacted carbonaceous feedstock and product gases and product solids;

passing the partially reacted carbonaceous feedstock and product gases and product solids from the inner reactor zone to the turnaround zone;

passing product gases and product solids from the turnaround zone to the outer reactor zone;

passing product gases and product solids from the outer reactor zone to a junction;

passing product gases from the junction to a gas off-take assembly;

passing product solids from the junction to a solids off-take assembly;

removing product gases from the continuous pyrolysis system through the gas off-take assembly; and removing product solids from the continuous pyrolysis system through the solids off-take assembly.

12. The method of claim 11, wherein the junction includes an inner passage that is fluidly connected to the feeder assembly and to the inner reactor zone, and an outer passage that is fluidly connected to the outer reactor zone, the turnaround zone, the gas off-take assembly and the solids off-take assembly.

13. The method of claim 12, wherein the step of passing the carbonaceous feedstock from the feeder assembly through the junction and through the inner reactor zone to the turnaround zone comprises:

conveying the carbonaceous feedstock from the feeder assembly through the inner passage of the junction and through the inner reactor zone to the turnaround zone by a first conveyance means.

14. The method of claim 12, wherein the step of passing product gases and product solids from the turnaround zone to the junction comprises:

conveying product gases and product solids from the turnaround zone through the outer reactor zone by a second conveyance means to the outer passage of the junction.

* * * * *

UNITED STATES PATENT AND TRADEMARK OFFICE
CERTIFICATE OF CORRECTION

PATENT NO. : 9,005,402 B2
APPLICATION NO. : 13/422011
DATED : April 14, 2015
INVENTOR(S) : Thomas R. Del Monte and Eren K. Yar Page 1 of 1

It is certified that error appears in the above-identified patent and that said Letters Patent is hereby corrected as shown below:

In the Claims,

There is an error on:

- Column 17
- Line 8
- Claim 1

The language of the paragraph should read:

a first conveyance means inside the feeder assembly and the fixed inner reactor pipe configured to move the carbonaceous feedstock through the feeder assembly and move the partially reacted carbonaceous feedstock and product solids through the fixed inner reactor pipe and deposit the partially reacted carbonaceous feedstock into the turnaround zone;

Signed and Sealed this
Twenty-first Day of July, 2015

Michelle K. Lee
*Director of the United States Patent and Trademark Office*